UNITED STATES PATENT OFFICE.

JOHN J. ELBERT, OF ELIZABETH, NEW JERSEY, ASSIGNOR TO AMERICAN CYANAMID COMPANY, OF NEW YORK, N. Y., A CORPORATION OF MAINE.

PROCESS FOR THE PRODUCTION OF AMMONIA.

1,313,885.     Specification of Letters Patent.     Patented Aug. 26, 1919.

No Drawing.     Application filed November 5, 1918. Serial No. 261,213.

*To all whom it may concern:*

Be it known that I, JOHN J. ELBERT, a citizen of the United States, residing at Elizabeth, in the county of Union and State of New Jersey, have invented certain new and useful Improvements in Processes for the Production of Ammonia; and I do hereby declare the following to be a full, clear, and exact description of the invention, such as will enable others skilled in the art to which it appertains to make and use the same.

This invention relates to a process for making ammonia from crude calcium cyanamid, or lime nitrogen, and has for its object to attain this result in a manner more expeditious and less costly than has heretofore been proposed. With these and other objects in view the invention consists in the novel steps and combinations of steps constituting my process, all as will be more fully hereinafter disclosed and particularly pointed out in the claims.

In order that my invention may be clearly understood it is said:—In U. S. Patents No. 1154640, process of producing ammonia, dated Sept. 28, 1915, to W. S. Landis; and No. 1163095, process of making ammonia from calcium cyanamid, dated Dec. 7, 1915, to W. S. Landis, it is disclosed that the reaction whereby ammonia is produced from calcium cyanamid is strongly exothermic, that steam may be used for a short time only to start the reaction, and that the reaction can be carried to completion by using steam intermittently. Although the consumption of steam in operating by the above intermittent processes is not as great as it was in operating the original process where it was used continuously, yet, nevertheless said steam forms quite an important item in the expense of the process. In general the procedure under these intermittent processes is to admit steam three times to the charge in order that a high recovery of the ammonia may be attained.

But, even with the triple admission of steam to the charge, I have found that the slurry leaving the autoclave, contains as much as 8% of the total ammonia in the charge although usually its content of ammonia is around 6%. This ammonia is essentially not present in the form of ammonia gas dissolved in the boiling hot liquor, but rather as some compound of nitrogen which readily gives off ammonia when again autoclaved. It was accordingly the practice, prior to this invention, to filter the sludge discharged from such autoclave and return the solution carrying a small amount of ammonia back to the apparatus for making up a fresh charge.

This involved a careful filtration, and particularly, a careful washing of the filter cake to recover the parts dissolved; and since the amount of make up water permitted in the process was limited this said older process was not capable of working much above say 98½% or 99% ammonia recovered.

I have found on the other hand, by varying this procedure in the following manner, that I can not only save about one third of the steam used in the older process, but at the same time, I can recover above 99½% of the ammonia in the lime nitrogen.

My new procedure is as follows:—The autoclaves are charged in the usual manner either by adding lime nitrogen to the liquor in the autoclave shell, or by making the slurry outside and pumping the same into the autoclave vessel.

Air may be blown through the slurry for purification purposes if found desirable. After the autoclave is charged with slurry, and closed up, I then introduce steam as in the usual procedure but instead of retaining the ammonia in the autoclave until steam is again admitted I discharge the bulk of the ammonia from the autoclave before admitting additional steam. For example, in practice I introduce steam into the charge until the pressure gage on the autoclave shows about 60 pounds per square inch, when I close the steam valve.

The pressure rapidly rises and I begin to discharge the generated ammonia gas, in the ordinary manner, and continue the discharge until the autoclave shows practically no pressure.

I then again introduce steam to a pressure of approximately 125 pounds per square inch, or at a temperature of say 300° F. or higher, and I then close the steam valve and hold the autoclave closed, at this pressure, for at least one hour. In general this pressure is maintained if the valves are tight without any further addition of steam, and at times the pressure may increase a fraction of an atmosphere due to the reaction in the autoclave.

At the end of the holding period, or rest, I find that substantially all the fixed nitrogen in the charge has been changed to ammonia. I discharge the ammonia gas from the autoclave until it shows no pressure, and then run out the slurry which is in the autoclave to a filter where I suck off the contained liquor and wash the cake.

By this method of operation it will be seen I avoid the necessity of the admission of steam to the autoclave for a third time, and at the same time, I obtain a liquor which contains little or no ammonia, either as such or in the form of compounds capable of yielding ammonia. The principal object of filtration in this invention is therefore not to recover dissolved ammonia, but to recover the alkali which is in the liquor, and return the same for the next operation. My improved process has the further advantage of decreasing somewhat the amount of labor required around the autoclave for it needs no attention during the period of rest.

In carrying out this new process I have actually measured the steam necessary to liberate substantially all the fixed nitrogen, and find it to be about 40 per cent. less than when I formerly operated the prior process requiring three periods of steam admission. At the same time, I have observed that I obtain a materially higher recovery of ammonia from the same weight of lime nitrogen. I further find that the process is facilitated if an alkali metal salt is added to the slurry or to the cyanamid. For example, I may mix dry sodium carbonate or caustic soda with the crude cyanamid before it goes into the apparatus.

It is of course, obvious that those skilled in the art may vary the details of my process without departing from the spirit of the invention, and therefore, I do not wish to be limited to the above disclosure except as may be required by the claims.

What I claim is:—

1. The process of making ammonia from commercial cyanamid consisting in making a slurry of said cyanamid with water; applying heat to said slurry to bring it to a reacting temperature; permitting the initial reaction to complete its course; discharging the ammonia thus generated; again applying heat to said slurry and maintaining a higher temperature and pressure for a period of time; again discharging from the apparatus any ammonia generated; and finally discharging the residual products of the reaction from the reaction vessel; substantially as described.

2. The process of making ammonia from commercial cyanamid consisting in making a slurry of said cyanamid with water; bringing said slurry to a reacting temperature to generate ammonia gas; discharging the gas thus formed from the apparatus; bringing the said slurry again to a higher reacting temperature and pressure to generate a second quantity of ammonia gas; holding said slurry at said higher pressure, until ssubstantially all the fixed nitrogen in the charge has been changed into the form of ammonia; discharging said second quantity of gas from the apparatus; and filtering the residual liquor to recover its valuable constituents for use in a subsequent operation, substantially as described.

3. The process of making ammonia from crude cyanamid, or lime nitrogen, which consists in making a slurry of said cyanamid; blowing air through said slurry; heating the slurry to a reacting temperature; discharging the initial ammonia thus generated; repeating the addition of heat at a higher temperature and maintaining said heat for a time sufficient to convert substantially all the fixed nitrogen present into ammonia, and discharging ammonia thus produced from the reaction vessel, substantially as described.

4. The process of making ammonia from commercial cyanamid which consists in making a slurry of said cyanamid with water derived from a previous operation; admitting steam to said slurry at a temperature below 300° F. and until ammonia is liberated; drawing off the ammonia thus produced; again admitting steam to said slurry and raising the same to a temperature above 300° F.; maintaining said last named temperature for a time sufficient to convert substantially all the fixed nitrogen present into ammonia; and drawing off said last named ammonia from the residual liquor, substantially as described.

5. The process of making ammonia from commercial cyanamid, consisting in making a slurry of said cyanamid; adding an alkali to said slurry; blowing air through the slurry; heating the slurry to an initial reaction temperature and recovering ammonia from said reaction; again heating the slurry to a temperature above 300° F. and maintaining said temperature for a period of at least one hour; recovering an additional quantity of ammonia thus produced; discharging the slurry from the reaction vessel; and recovering the valuable constituents of said slurry, substantially as described.

In testimony whereof I affix my signature in presence of two witnesses.

JOHN J. ELBERT.

Witnesses:
ALICE E. STRAND,
GEORGE E. COX.